(12) United States Patent
Latella et al.

(10) Patent No.: US 9,471,158 B2
(45) Date of Patent: Oct. 18, 2016

(54) UNIVERSAL STYLUS

(71) Applicants: Ricky Latella, Woodstock, IL (US); Joseph John Cecala, III, Park Ridge, IL (US); Robert Dale Polak, Lindenhurst, IL (US); Edward George Vardy, St. Louis, MO (US)

(72) Inventors: Ricky Latella, Woodstock, IL (US); Joseph John Cecala, III, Park Ridge, IL (US); Robert Dale Polak, Lindenhurst, IL (US); Edward George Vardy, St. Louis, MO (US)

( * ) Notice: Subject to any disclaimer, the term of this patent is extended or adjusted under 35 U.S.C. 154(b) by 544 days.

(21) Appl. No.: 13/910,404

(22) Filed: Jun. 5, 2013

(65) Prior Publication Data

US 2014/0362022 A1    Dec. 11, 2014

(51) Int. Cl.
*G06F 1/00* (2006.01)
*G06F 3/0354* (2013.01)
*G06F 3/044* (2006.01)

(52) U.S. Cl.
CPC ....... *G06F 3/03545* (2013.01); *G06F 3/03542* (2013.01); *G06F 3/044* (2013.01)

(58) Field of Classification Search
CPC .................................. G09G 5/00; G06F 3/033
See application file for complete search history.

(56) References Cited

U.S. PATENT DOCUMENTS

| | | | |
|---|---|---|---|
| 2004/0051691 A1* | 3/2004 | Hedrick | 345/102 |
| 2004/0140965 A1* | 7/2004 | Wang et al. | 345/179 |
| 2011/0169775 A1* | 7/2011 | Liaw et al. | 345/175 |
| 2012/0236031 A1* | 9/2012 | Haddick ............ G02B 27/0093 345/633 |

* cited by examiner

*Primary Examiner* — Michael Faragalla
(74) *Attorney, Agent, or Firm* — Justin Lampel

(57) ABSTRACT

The present device provides for a universal stylus. The stylus emits a light incident upon a distal metallic object therein causing electrons on the metallic object to be ejected from the metallic object, resulting in a non-uniform electric field near the metallic object. When the metallic object is brought into close proximity of a capacitive touch-screen of a smartphone, tablet, kiosk, computer or other electronic device, the local disruption in the electric field surrounding the touch-screen is registered as a touch, in a similar manner as a human finger normally activates the touch-screen. In an embodiment, the device utilizes a light incident directly upon the electronic device, without the need for the light incident striking a metallic object.

23 Claims, 8 Drawing Sheets

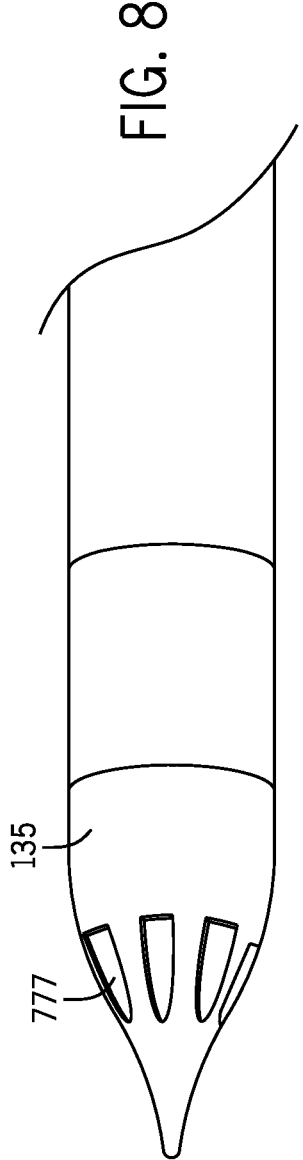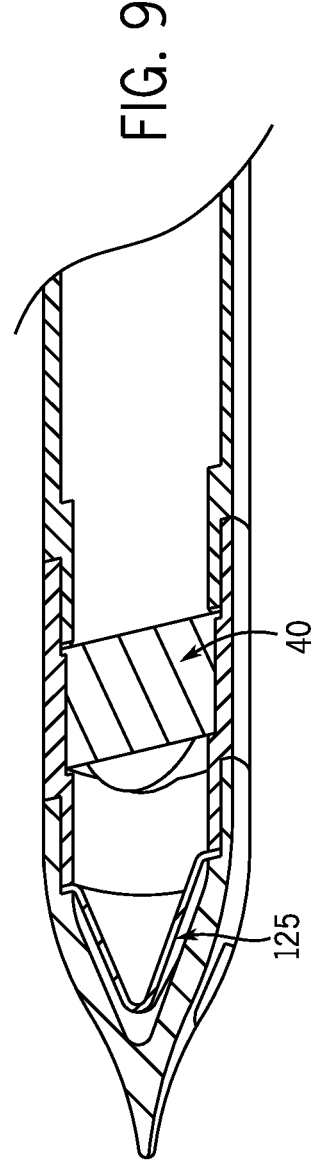

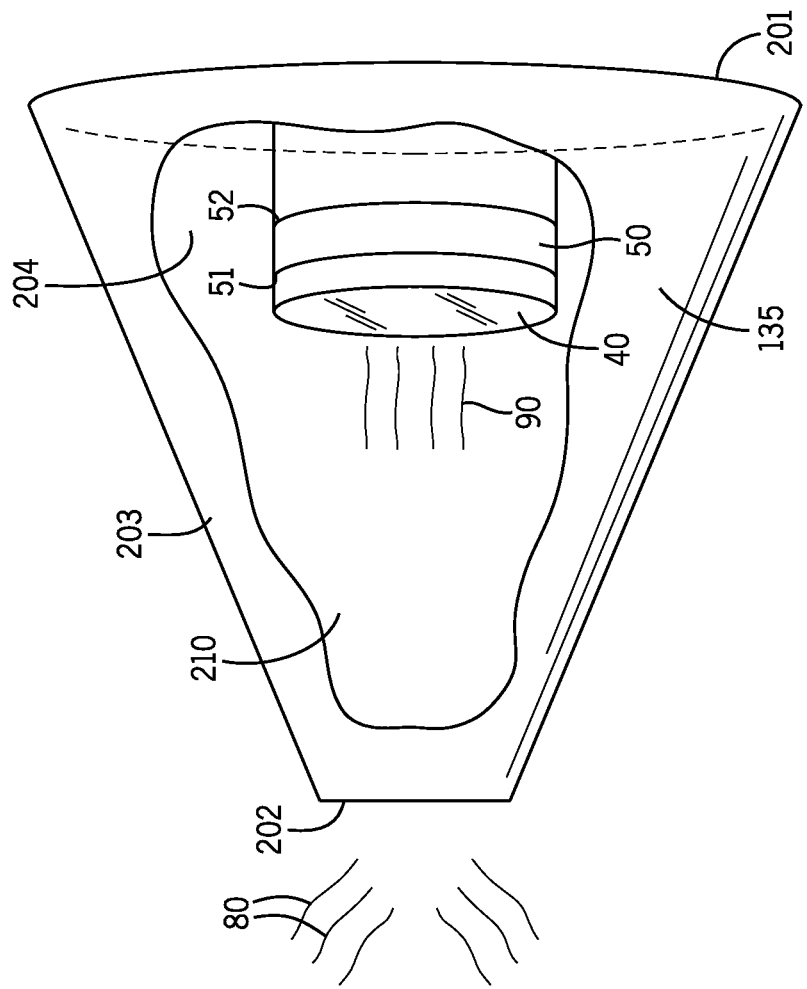
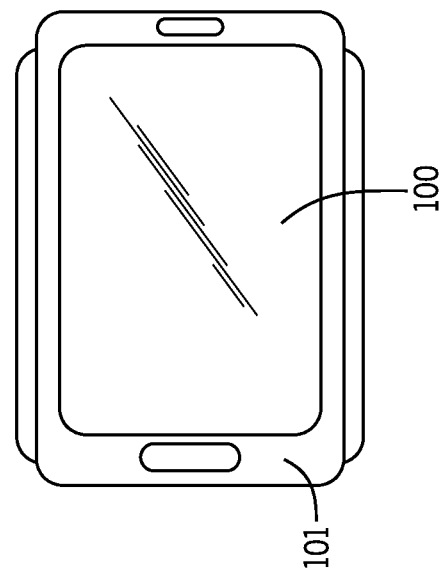
FIG. 10

UNIVERSAL STYLUS

BASED ON PROVISIONAL

The following application is based on U.S. provisional patent application 61/660,014 filed on Jun. 15, 2012. The present application claims priority to the '014 application, the entire contents of which are incorporated by reference.

BACKGROUND OF THE INVENTION

The present device provides for a universal stylus. The stylus emits a light incident upon a distal metallic object therein causing electrons on the metallic object to be ejected from the metallic object, resulting in a non-uniform electric field near the metallic object. When the metallic object is brought into close proximity of a capacitive touch-screen of a smartphone, tablet, kiosk, computer or other electronic device, the local disruption in the electric field surrounding the touch-screen is registered as a touch, in a similar manner as a human finger normally activates the touch-screen. In an embodiment, the device utilizes a light incident directly upon the electronic device, without the need for the light incident striking a metallic object.

Capacitive touch screen sensors designed to recognize a finger touch do not currently have the sensitivity to recognize very small-tip passive styluses. A device enabling a small tip stylus which may sufficiently activate (register a touch) on most capacitive touch screens including smartphones, tablets, kiosks, computers and other touch screen devices would greatly improve the touch screen experience across various end-user applications.

Accordingly, the present device provides for a universal stylus. The present universal stylus emits a light incident upon a distal metallic object located in the stylus resulting in a non-uniform electric field near the metallic object. When the metallic object, located at or near the tip of the stylus, is brought into close proximity of a capacitive touch-screen of a smartphone, tablet, kiosk, computer or other electronic device, the local disruption in the electric field surrounding the touch-screen is registered as a touch, in a similar manner as a human finger normally activates the touch-screen. More specifically, the present device creates a conductive region/space around the tip of the universal stylus in such a way that it distorts the electric field of the capacitive touch sensor on the device, to an extent much larger than is possible with a passive tip having the same geometry. As a result, the present universal stylus allows for a narrower pen type tip stylus design. Further, the present universal stylus generates a non-uniform electric field near the surface of the touch-screen of the electronic device for which it is interfacing with, virtually rendering a touch as if a user's finger were in contact with the surface of the electronic device. As an alternative theory to operation, the light source of the device may activate the air surrounding the tip and may convert the air into a conductive plasma which may be made to produce a signal on a touch panel in a similar fashion as how the device may be activated by a human touch.

Capacitive sensing technology works by using the human body as a capacitance for input to an electronic device. More specifically, touch-screen devices generally work when a user's finger alters the normally uniform electrostatic field of the touch-screen of the device. In typical touch-screens, only one side of the touch-screen has an insulator coated with a conductive material. Through a power source, a small voltage is uniformly spread throughout the insulator. As a user touches the touch-screen of the device with his or her finger, the user's finger acts as a conductor and a capacitor is dynamically formed therein disrupting the insulator at the specific spot on the touch-screen and allowing the electronic device to register the desired operation selected by the user. Capacitive touch sensors are used in many devices such as laptop trackpads, digital audio players, computer displays, mobile phones, mobile devices, tablets and others.

Capacitive touch screen sensors designed to recognize a finger touch do not currently have the sensitivity to recognize very small tip passive styluses. The present device provides a small tip universal stylus which may sufficiently activate (register a touch) on most capacitive touch-screens including cell phones, tablets, television, kiosk and other touch-screen devices therein allowing for multiple end-user applications.

In an attempt to improve on the stylus-computer interaction, multiple devices have been created. For example, U.S. Patent Publication No.: 20110199333 to Philipp discloses a capacitive sensor for determining the presence of an object, such as a user's finger or a stylus. The sensor includes a substrate on which electrodes are deposited. A resistive drive electrode is arranged on one side of the substrate and a resistive sense electrode is arranged on the other side of the substrate. A shorting connection connects between two locations on one of the electrodes. The electrodes are connected to respective drive and sense channels.

Further, U.S. Publication No.: 20100006350 to Elias discloses methods and apparatuses adapted to ensure that contact from a stylus will be detected on a low resolution touch sensor panel irrespective of the location of the region of contact upon the touch surface. In some embodiments, a metallic or otherwise conductive disk may be attached to one end of the stylus. The disk may be sized so as to guarantee sufficient electrical interaction with at least one sensory element of the touch sensor panel. In some embodiments, the stylus may be powered so as to provide a stimulus signal to the capacitive elements. Optionally, one or more force and/or angle sensors disposed within the stylus can supply additional data to the touch panel.

U.S. Publication No.: 20040119701 to Mulligan discloses a lattice touch-sensing system for detecting a position of a touch on a touch-sensitive surface. The lattice touch-sensing system may include two capacitive sensing layers, separated by an insulating material, where each layer consists of substantially parallel conducting elements, and the conducting elements of the two sensing layers are substantially orthogonal to each other. Each element may comprise a series of diamond shaped patches that are connected together with narrow conductive rectangular strips. Each conducting element of a given sensing layer is electrically connected at one or both ends to a lead line of a corresponding set of lead lines. A control circuit may also be included to provide an excitation signal to both sets of conducting elements through the corresponding sets of lead lines, to receive sensing signals generated by sensor elements when a touch on the surface occurs, and to determine a position of the touch based on the position of the affected bars in each layer.

However, these publications fail to disclose a universal stylus for use with virtually any touch-screen. In particular, these publications fail to disclose the use of plasma to perform the function of a conductive pliable mass which establishes strong capacitive coupling with a touch-screen. Further, these publications fail to disclose a universal plasma stylus which operates in a safe and efficient manner as provided below.

SUMMARY OF THE INVENTION

Accordingly, the present device provides for a universal stylus. The present universal stylus emits a light incident upon a distal metallic object located in the stylus. The light therein causes electrons on a metallic object located within or at the tip of the stylus to be ejected by the photoelectric effect. The presence of a net positive charge remaining on the metal tip or the presence of electrons near the surface of the tip will disrupt the electric field of the capacitive touch panel, resulting in the device in recording a touch near the surface of the tip. An additional theory as to the operation of the present universal stylus if that the light emitted by the device may also ionize the air near the tip directly or through the ejected electrons, also disrupting the electric field of the capacitive touch sensor. When the metallic object, located at or near the tip of the stylus, is brought into close proximity of a capacitive touch-screen of a smartphone, tablet, kiosk, computer or other electronic device, the local disruption in the electric field surrounding the touch-screen is registered as a touch, in a similar manner as a human finger normally activates the touch-screen. As a result, the present universal stylus allows for a narrower pen type tip stylus design. Further, the present universal stylus generates a non-uniform electric field near the surface of the touch-screen of the electronic device for which it is interfacing with, virtually rendering a touch as if a user's finger were in contact with the surface of the electronic device. In an embodiment, the device utilizes a light incident directly upon the electronic device, without the need for the light incident striking a metallic object.

An advantage of the present device is that the device creates a non-uniform electric field in the vicinity of a stylus tip to increase the effective coupling area between the stylus tip and the capacitive touch-screen while allowing for a narrower tip stylus design.

A still further advantage of the present device is that the present universal stylus may be used with almost any capacitive and or resistive touch-screen regardless of the manufacturer or sensitivity.

Yet another advantage of the present universal stylus is that the present stylus is light-weight.

Still another advantage of the present universal stylus is that the stylus is sturdy and resistant to damage.

In an embodiment, the present universal stylus produces a light incident which acts directly on the electronic device to control the device without the need for the light incident striking a metallic object.

And another advantage of the present universal stylus is that the present universal stylus has a smaller physical area than a human finger resulting in greater accuracy in touch location.

Yet another advantage of the present universal stylus is that the present universal stylus is inexpensive to produce.

Yet another advantage of the stylus is that the effective disruption of the capacitive touch sensor in proximity of the tip may be controlled by changing the intensity of the light source, therein enabling the effective working area presented by the stylus.

Yet another advantage of the universal stylus is that the "tip" technology may be fully compatible with any active pen technology for capacitive touch screens.

Yet another advantage to the universal stylus is that the stylus may either appear as a finger, or, by pulsing for example, be identified by the unit for example mobile phone using certain software.

Still another advantage of the universal stylus is that the device may also enable data transfer.

For a more complete understanding of the above listed features and advantages of the present universal stylus, reference should be made to the drawings. Further, additional features and advantages of the invention are described in, and will be apparent from the detailed description of the preferred embodiments.

BRIEF DESCRIPTION OF THE DRAWINGS

FIG. 8 illustrates the exterior surface of the cone housing in an embodiment.

FIG. 9 illustrates an interior view of the cone housing in an embodiment.

FIG. 10 illustrates the device wherein the light incident does not act directly on a metallic object.

DETAILED DESCRIPTION OF THE PREFERRED EMBODIMENTS

Accordingly, the present device provides for a universal stylus. The present universal stylus emits a light incident upon a distal metallic object located in the stylus creating a non-uniform electric field near the metallic object. Light incident upon the metallic object can cause electrons to be ejected through the photoelectric effect. The presence of these electrons near the surface of the tip or the net positive charge remaining on the metal both will disrupt the electric field of a capacitive touch sensor. Furthermore, the disruption of the electric field of a capacitive touch sensor can also occur as a result of ionized air, resulting directly from light incident upon the air or the ejected electrons ionizing the air. When the metallic object, located at or near the tip of the stylus, is brought into close proximity of a capacitive touch-screen of a smartphone, tablet, kiosk, computer or other electronic device, the local disruption in the electric field surrounding the touch-screen is registered as a touch, in a similar manner as a human finger normally activates the touch-screen. As a result, the present universal stylus allows for a narrower pen type tip stylus design. Further, the present universal stylus generates a non-uniform electric field near the surface of the touch-screen of the electronic device for which it is interfacing with, virtually rendering a touch as if a user's finger were in contact with the surface of the electronic device. In an embodiment, the device utilizes a light incident directly upon the electronic device, without the need for the light incident striking a metallic object.

Figure 1:
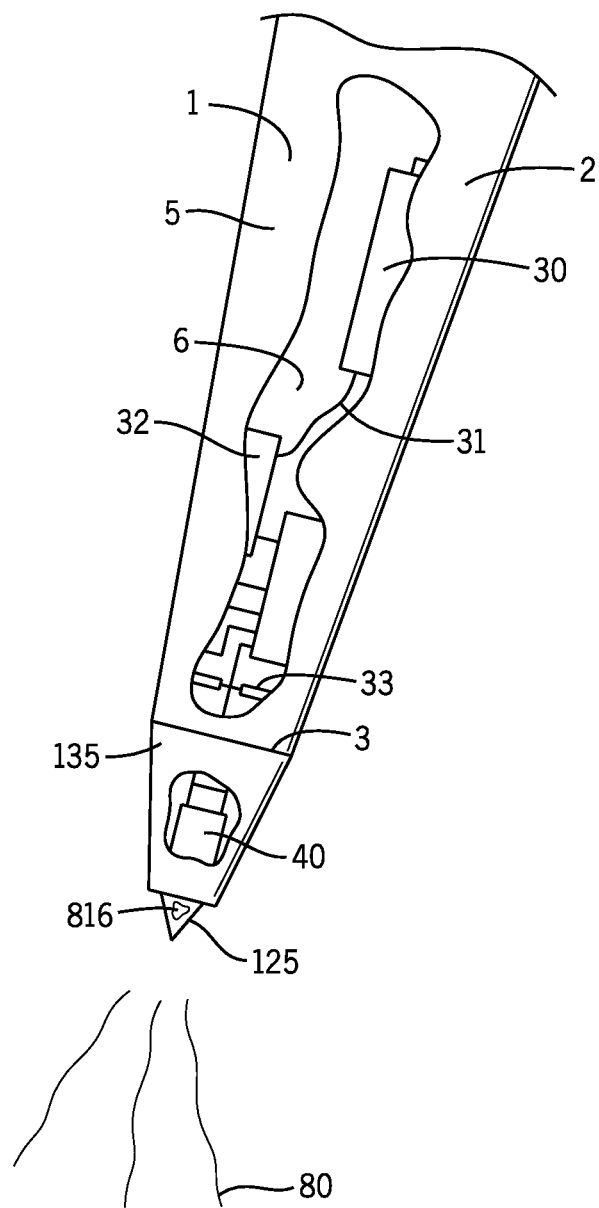
FIG. 1 illustrates an embodiment of the universal stylus wherein a portion of the interior of the housing and the interior components of the stylus are visible.
Figure 2:
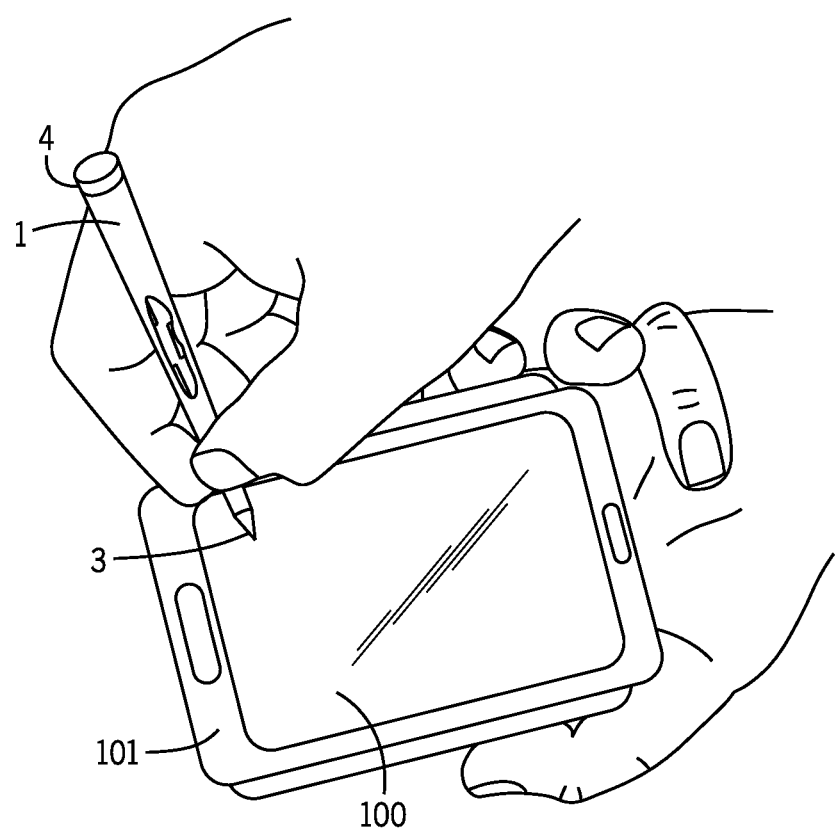
FIG. 2 illustrates the universal stylus being used in connection with a touch-screen device.

Referring now to FIG. 1, a universal stylus 1 is illustrated. The universal stylus 1 has a main body housing 2 having a first end 3, a second end 4 (FIG. 5), a generally cylindrical exterior surface 5 and an interior 6. In an embodiment, the main body housing 2 is approximately five inches in length; however, it should be understood that a main body housing 2 of any length may be implemented. The main body housing 2 may be made from, for example, plastic and may take the form and shape as a typical stylus or pen. Preferably, the universal stylus 1 may be used near a touch-screen device 101 (FIG. 2).

Figure 3:
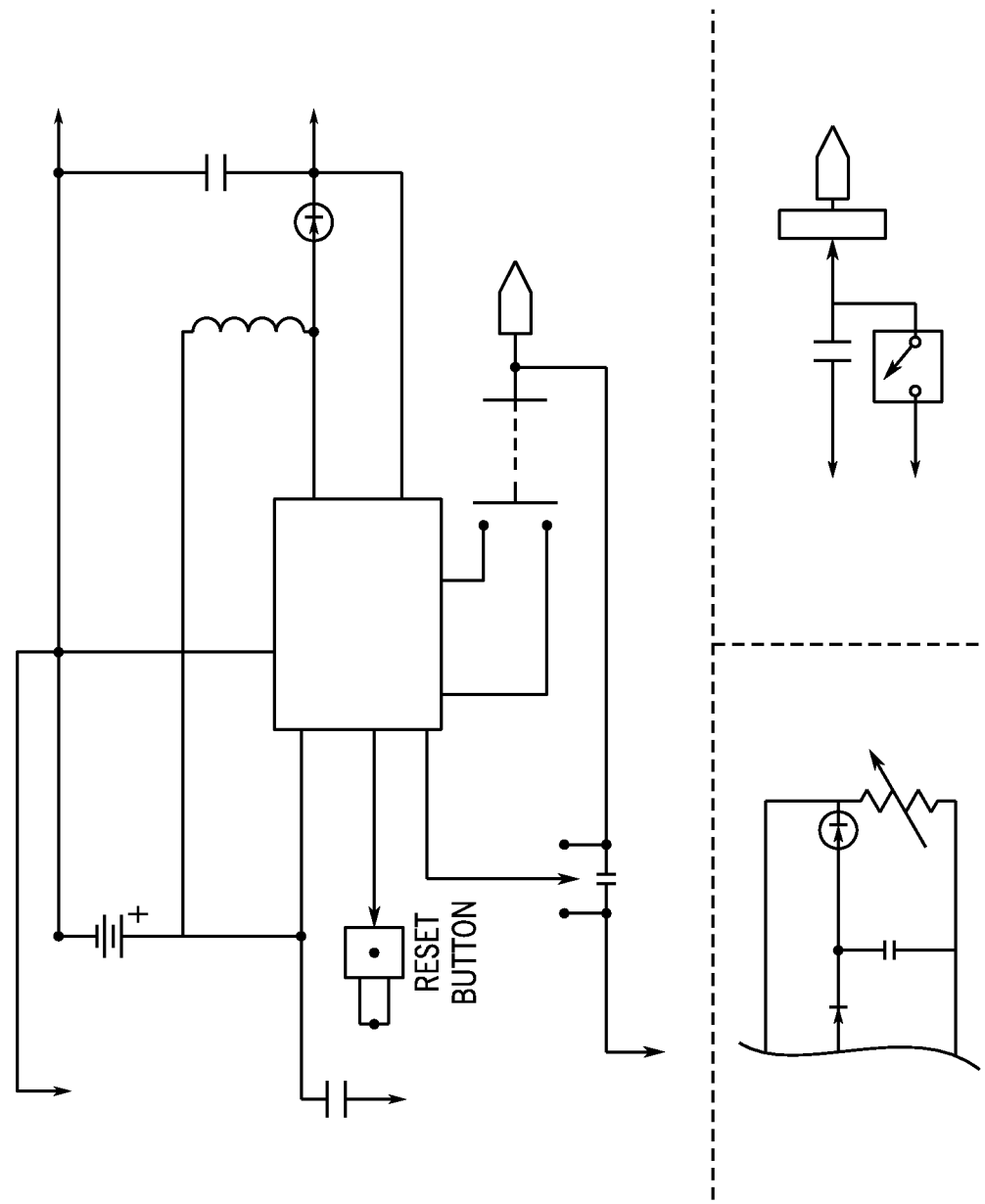
FIG. 3 illustrates the electrical schematic of the stylus.

Located within the interior 6 of the main body housing 2 of the device 1 may be a power source 30. In an embodiment, the power source 30 may be, for example, a 1.55 volt disc battery. Mechanically and electronically attached to the power source 30 may be an electrical wire 31. More specifically, the electrical wire 31 may connect the power source 30 to an electric circuit board 32 (FIG. 3).

In an embodiment, a Light Emitting Diode LED 40 (or other similar solid state lighting sources such as an Organic Light Emitting Diode OLED or a laser) may be implemented within the device 1. LEDs are particularly useful in that they provide a high conversion of electric energy into photons which may be used to disrupt the electric field of the capacitive touch sensor. Preferably, the present device uses an LED which emits light of wavelength of approximately between 250-350 nm (preferably 280 nm) in the ultraviolet region; creating relatively higher-energy photons than those created by a visible light source. It should be noted that the wavelength may be of a broader range, including, but not limited to, between 200 and 400 nm.

Figure 4:
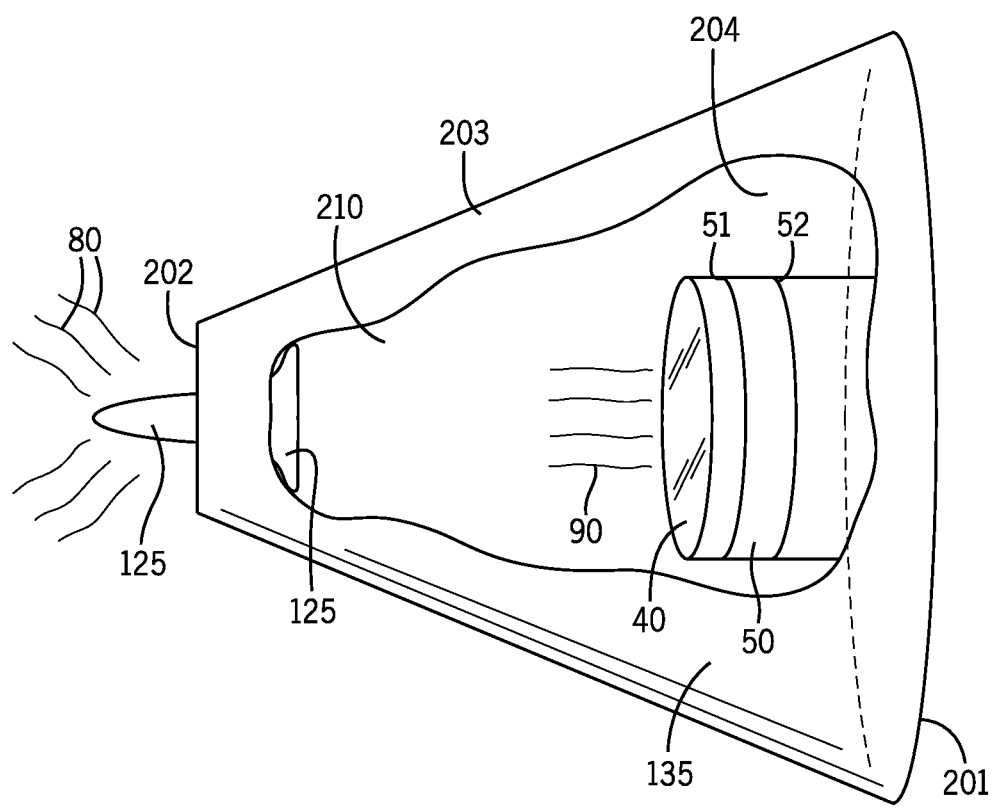
FIG. 4 illustrates a detailed view of the interior components of a cone housing of the universal stylus.

Referring now to FIG. 4, in an embodiment, a cone housing 135 is provided. The cone housing 135 may be located at, and removably secured to, the first end 3 of the housing 2 of the universal stylus 1. The cone housing 135 may be secured to the first end 3 of the main body housing 2 by, for example, being screwed, snap fitted, compression fitted or friction fitted onto the main body housing 2. The cone housing 135 may have a first end 201, a second end 202, a generally cone-shaped exterior surface 203 and an interior 204. An opening (not shown) may be located at the second end 202 of the cone housing 135. A metallic cone 125 (or other suitable metallic object) may be secured within the interior 204 of the cone housing 135 and may extend partially outward through the opening at the second end 202 of the cone housing 135 such that a portion of the metallic cone 125 is located within the interior 204 of the cone housing 135 and a portion extends outside of the interior 204 of the cone housing 135. The metallic cone 125 is made from a metal. Although the present embodiment uses magnesium or a magnesium based metal or material, other metals, as described below in a chart, may be used. In an embodiment, a non-abrasive electrically conducting or non-electrically conducting coating is added to the metallic cone 125 to prevent scratching of the touch-screen 101 of the electronic device for which the present stylus 1 is acting upon. In an embodiment, the metallic cone 125 may be made substantially from Mg, Cs, Rb, Na, Ba, Sr, Ca, Zn, Cd, Al, Cu, Fe or C. In an embodiment the end (or tip) of the device 1 may be shaped to allow electrons and ions to flow to desired areas, and back into the inside of the stylus 1 to make electrical contact to de-ionize the metallic cone 125.

Located within the interior 204 of the cone housing 135 (or within the interior 6 of the main body housing 2) may be the LED 40 (FIG. 4 illustrates the LED 40 within the cone housing 135 as opposed to the main body housing 2). The cone housing 135 may therein protect the delicate nature of the LED 40. In an embodiment the cone housing 135 is opaque so as to prevent the LED (or other light source) from causing damage to the eyes of individuals in close proximity. In this embodiment, no light exits the interior 204 of the cone housing 135. In an alternative embodiment, the cone housing 135 is semi-transparent so as to allow a user to instantly confirm if the LED 40 is operational. In an embodiment, the LED 40 may be used not only to activate a touch screen device 100, but also may be used for security, currency validation, germicide, and general illumination, etc.

When the device 1 is turned on, the LED 40 is activated and light 90 is emitted from the LED 40. The light 90 emitted from the LED 40 travels a short distance and substantially fills the entire interior 204 of the cone housing 135 and strikes the metallic cone 125. When the energy in the light 90 strikes the metallic cone 125, the energy of the light 90 is transferred to the metallic cone 125. When the energy level of the metallic cone 125 is increased by the light 90 and when the metallic cone 125 is placed in close proximity to the capacitive touch sensor (for example the touch-screen device 101), the metallic cone 125 creates a disruption of the electric field of the capacitive touch sensor near the metallic cone 125 and therein the metallic cone 125 activates the touch-screen 101 of the electronic device. A possible mechanism for this interaction could be the photoelectric effect, where the light's energy causes electrons to be emitted from the metal, creating a non-uniform electric field that activates the capacitive touch sensor.

In an embodiment the cone housing 135 may be removed allowing light to be emitted from the body of the stylus. The light may be used to confirm the validity of currency or identifications, or may be used for germicide.

In an embodiment, the interior walls 210 of the cone housing 135 may be generally reflective so as to allow the light 90 to bounce off the reflective surfaces until the light 90 ultimately strikes the metallic cone 125. The reflective surface of the interior walls 210 of the cone housing 135 therein helps to maximize the amount of light 90 which strikes the metallic cone 125 therein requiring less light 90 and energy to be utilized by the device 1.

In an embodiment, the LED 40 of the device 1 may be secured at least partially within a LED housing 50 (FIGS. 4 and 7); wherein the LED housing 50 acts as a temporary securing mechanism for the LED 40. More specifically, the LED 40 may be removed from the LED housing 50 by, for example, unscrewing the LED 40. The LED housing 50 may be located substantially at the first end 3 of the main body housing 2 of the universal stylus 1. The LED housing 50 may have a first end 51 and a second end 52. The first end 51 of the LED housing 50 may face outward, away from the interior 6 of the main body housing 2 of the stylus 1 whereas the second end 52 of the LED housing 50 may be located near or within the interior 6 of the main body housing 2 of the universal stylus 1 (FIG. 4 illustrates the entire LED housing 50 located in the cone housing 135). The LED housing 50 may absorb some of the pressure and stress which would otherwise be directed at the LED 40. As a result, the LED housing 50 helps protect the LED 40 from damage.

In an embodiment, the cone housing 135 at the first end 3 of the device 1 may be removable so that the light 90 may be used for purposes other than activating a touch-screen 100. For example, the light 90 may be used as a flashlight or as a laser pointer.

Figure 5:
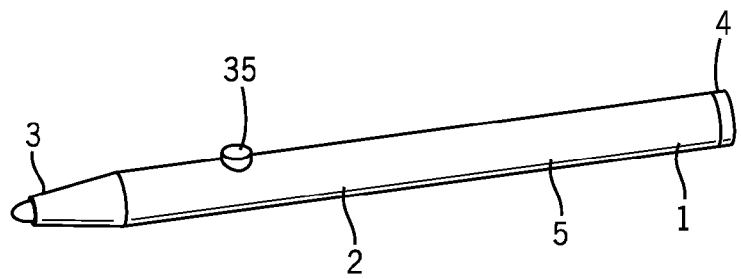
FIG. 5 illustrates a perspective view of an embodiment of the universal stylus.
Figure 7:
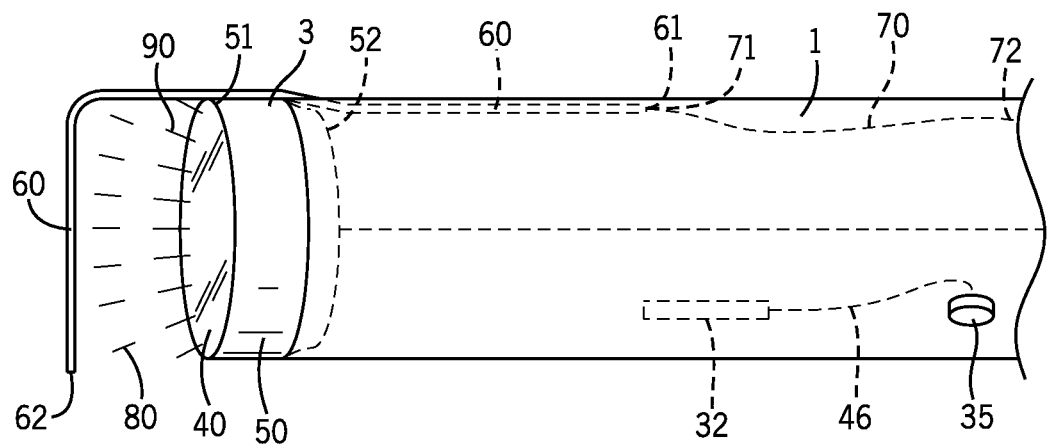
FIG. 7 illustrates a close-up view of the first end of an embodiment of the universal stylus wherein a metallic strip is utilized.

As stated above, the universal stylus 1 may have an electric circuit board 32. Mechanically and electrically connected to the electric circuit board 32 may be a load resistor. The load resistor may have a resistance of approximately fifty to one hundred and fifty Ohms in series with an on-off switch 35 (FIG. 5). The on-off switch 35 may be, for example, a button switch, which may allow the user to selectively turn on or off the device 1. The on-off switch 35 of the universal stylus 1 may be directly connected to the electrical circuit 32 by an electrical wire 46 (FIG. 7). Additionally, an electrical switch to ground may be used to automatically bleed residual charge.

Figure 6:
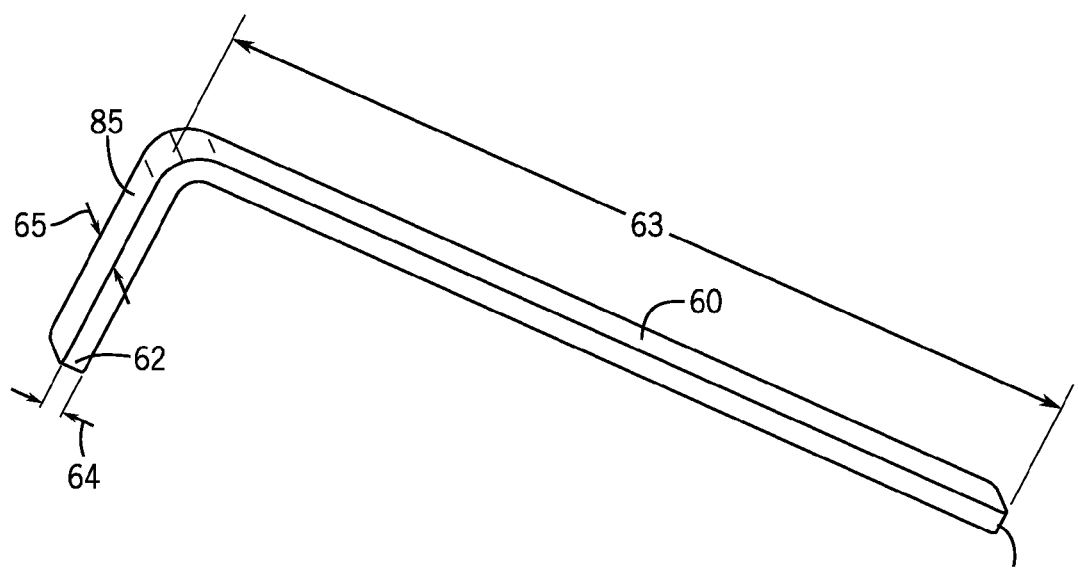
FIG. 6 illustrates an embodiment of the universal stylus wherein a metallic strip is utilized.

Referring now to FIGS. 6 and 7, in an alternative embodiment to the metallic cone 125 embodiment, located just beyond the first end 3 of the main body housing 2 of the universal stylus 1 may be a metallic strip 60. In the preferred embodiment, magnesium may be utilized. The metallic strip 60 may have a first end 61, a second end 62, a length 63, a width 64 and a thickness 65. The first end 61 of the metallic strip 60 may be mechanically and electronically connected to a first end 71 of an insulated wire 70. The second end 72 of the insulated wire 70 may be grounded. The second end 62 of the metallic strip 60 may be located near the LED 40 (as described below). In an embodiment, the device 1 may be grounded through the skin of the user.

In an embodiment, a portion 85 (FIG. 6) of the metallic strip 60 may be angled or bent. More specifically, the majority of the metallic strip 60 (including the first end 61) may run largely parallel with respect to the generally cylindrical exterior surface 5 whereas the second end 62 of the metallic strip 60 may be bent so that the second end 62 of the metallic strip 60 is located over the LED 40. In particular, the second end 62 may be bent at approximately a right angle with respect to the remainder of the metallic strip 60. The bent portion 85 may have a surface area roughly the same size as the LED 40 (FIG. 7).

In an embodiment, the first end 61 of the metallic strip 60 is secured within the interior 6 of the main body housing 2 by, for example, glue (can be conductive or insulating) or a securing tie so that the first end 61 and the majority of the metallic strip 60 (aside from the second end 62) is protected from damage. The second end 62 of the metallic strip 60 may extend outside of the interior 6 of the main body housing 2. More specifically, a portion of the length 63 may extend beyond the main body housing 2 and the LED 40 such that the second end 62 of the metallic strip 60 is the distal most point of one end of the universal stylus 1.

When the switch 35 is turned into the 'on' position, the LED 40 located in the LED housing 50 receives power from the power source 30 and the LED 40 therein becomes illuminated. As light 90 extends outward from the LED 40, the light 90 rays strike the metallic strip 60. As a result, when the device 1 is brought into close proximity of a capacitive touch sensor, the electric field of the capacitive touch sensor will be disrupted near the second end 62 of the metallic strip 60. This process is substantially the same as is utilized in the metallic cone 125 embodiment. When the universal stylus 1 is located on or in very near vicinity of the touch-screen 100 of a touch-screen device 101, the non-uniform electric field 80 created by the device 1 near the second end 62 of the metallic strip 60 may be registered by the touchscreen device 101 as a touch, similar to that of a human finger.

Traditionally, a touch-screen device 101 works as a result of a finger altering the normally uniform electrostatic field of the touch-screen 100. In typical touch-screens 101, only one side of the screen has an insulator coated with a conductive material. Through a power source, a small voltage is uniformly spread throughout the insulator. As a user touches the touch-screen 101 of the device with his or her finger, the user's finger acts as a conductor and a capacitor is dynamically formed therein disrupting the insulator at the specific spot on the touch-screen 101 and allowing the electronic device to register the desired operation selected by the user.

In order to get a "ball point pen" feel from a stylus a switch or pressure sensor may be used to activate the LED.

The present device 1 creates a disruption of the electric field of a capacitive touch sensor near the metallic cone 125 (or strip 6) of the present universal stylus 1. More specifically, the present device 1 controls the touch-screen 100 by creating a non-uniform electric field near the surface of the touch-screen 100 though the presence of emitted electrons from the metal or through a residual net charge on the metal itself.

In an embodiment of the universal stylus 1, a UV LED with a peak wavelength which centers at approximately 280 nm is utilized as the light source of the device 1. The UV LED creates photons of energy of approximately 4.4 electron-volts. These photons may have more than sufficient energy to eject electrons from magnesium (or some other metals), which has a work function of approximately 3.66 electron-volts. Those skilled in the art will recognize that the work function varies for different elements and electrons may be ejected from many metals, such as alkali metals, with less energetic photons. As a result, ultraviolet light sources are not necessary or even preferable to create the necessary non-uniform electric field which would register a touch on the electronic device. Furthermore, the light source utilized to activate the touch-screen does not necessarily have to be incorporated into the actual universal stylus 1 itself. Instead, the light source utilized may be the light source of the actual touch-screen device (instead of the light being located in the stylus).

Many touch screen devices use transmissive liquid crystals displays which are backlit by white LEDs which consist of blue LEDs with a yellow phosphor. These LEDs generally have a sharp peak in the emitted spectrum near 450 nm. A stylus containing a metal with sufficiently low work function may be placed near the surface and may create the non-uniform electric field without having the light source present on the universal stylus. As a result, in an embodiment, the device 1 lacks the illuminating device and relies on the illuminating device of the electronic device for which the present stylus is acting upon.

Table of Elements, their work function, (listed in order of increasing work function)

| Metal Element | Work Function (eV) | Wavelength (nm) |
|---|---|---|
| Cs (alkali) | 2.14 | 580 |
| Rb (alkali) | 2.261 | 549 |
| Na (alkali) | 2.36 | 525 |
| Ba (alkaline earth) | 2.52-2.7 | 492 |
| Sr (alkaline earth) | 2.59 | 479 |
| Ca (alkaline earth) | 2.87 | 432 |
| Mg (alkaline earth) | 3.66 | 339 |
| Zn | 3.63-4.9 | 341 |
| Cd | 4.08 | 304 |
| Al | 4.06-4.26 | 305 |
| Cu | 4.53-5.1 | 274 |
| Fe | 4.67-4.81 | 266 |
| C | 4.81 | 266 |

As a more detailed theoretical explanation, as the LED 40 produces 90 photons, those photons 90 strike the metallic cone 125 or metal strip 60. When the metallic cone 125 or strip 60 receives the light 90, the metallic cone 125 or metal strip 60 is slightly energized and electrons are therein ejected from the metallic cone 125 or metal strip 60. As a result, the metallic cone 125 or metal strip 60 acquires a positive charge. The positive charge of the metallic cone 125 or metal strip 60 therein ionizes the air immediately surrounding the metallic cone 125 or metal strip 60. Electrons from the air therein are drawn toward the metallic cone 125 or metal strip 60 creating an "ionic cloud." It is this negative cloud which may activate the touch-screen devices.

Referring now to FIGS. 8 and 9, in an embodiment, the exterior surface of the cone housing 135 may have ports 777. The ports 777 are provided to allow ions to circulate in and out of the device. In an embodiment, the metallic cone 125 may substantially take up the interior 204 of the cone housing 135. As a result, more metal is available for the light incident 90 to strike and therein a stronger non-uniform electric field 80 may be generated.

Referring now to FIG. 10, in an embodiment, the device 1 lacks a metallic object. More specifically, in an embodiment, the device generates a light incident 90, as described above, which is strong enough to directly generate sufficient amount of ions/plasma in the air surrounding the tip 80 without first striking a metallic object. As a result, the device 1 may be not only less expensive and easier to manufacturer, but may also prevent scratches on the surface of the touch-screen device 101. FIG. 10 illustrates the light 90 emitted from the device directly generating sufficient amount of ions/plasma in the air surrounding the tip 80 without striking the metallic object (125 in FIG. 4). In an embodiment, the photons needed to generate sufficient amount of ions/plasma in the air surrounding the tip 80 is approximately less than 260 nm.

Although embodiments of the invention are shown and described therein, it should be understood that various changes and modifications to the presently preferred embodiments will be apparent to those skilled in the art. Such changes and modifications may be made without departing from the spirit and scope of the invention and without diminishing its attendant advantages.

The invention claimed is:

1. An electronic stylus and a capacitive sensing touch-screen electronic device system comprising: an electronic stylus having a generally cylindrical housing having a first end and a second end; a touch-screen electronic device having an illuminating device located therein; a metallic object secured to and located near the first end of the generally cylindrical housing of the electronic stylus wherein the metallic object is capable of emitting a plurality of electrons when struck by a light incident generated by the illuminating device located within the touch-screen of the electronic device; wherein there is no physical permanent connection between the electronic stylus and the touch-screen electronic device having the illuminating device; wherein the illuminating device produces a light incident which strikes the metallic object and energizes the metallic object and causes the metallic object to eject electrons therein forming a non-uniform electric field near the metallic object; and wherein the non-uniform electric field created by the metallic object therein is detected by a capacitive sensing electronic touch-screen device and wherein the capacitive sensing electronic device may be operated and controlled by movement of the non-uniform electric field surrounding the metallic object.

2. The electronic stylus of claim 1 wherein the illuminating device is at least one of: a LED light or a UV fluorescent light tube which is driven with high voltage low current Electroluminescent driver circuit or which is driven with high voltage low current Electroluminescent driver circuit or an UV incandescent light bulb or a laser light source or OLED light source.

3. The electronic stylus of claim 1 wherein the light source is contained in a generally cylindrical housing with a hollow interior portion.

4. The electronic stylus for the capacitive sensing touch screen of claim 3 further comprising: a reflective surface substantially surrounding an interior cylindrical wall of a generally hollow cone-shaped attachment wherein the reflective surface focuses the light beam generated by the illuminating device toward a metallic object.

5. The electronic stylus for the capacitive sensing touch screen of claim 1 wherein the light source has a wavelength between approximately 200 and 700 nm.

6. The electronic stylus of claim 1 where the object registers a touch via an plasma ion cloud.

7. The electronic stylus of claim 1 where the object registers a touch via a non-uniform electric field.

8. An electronic stylus of claim 1 consisting of an illuminating device with light incident upon an object that is composed primarily of metal that when brought into proximity of a capacitive sensor registers a touch.

9. The electronic stylus of claim 8 where the illuminating device and metallic object are rigidly connected.

10. The electronic stylus of claim 9 wherein the illumination source is contained within a generally cylindrical housing with a portion that has a hollow interior.

11. The electronic stylus of claim 9 wherein the illuminating device is at least one of: a LED light or a UV fluorescent light; or an UV incandescent light bulb; or a laser light source; or OLED light source.

12. The electronic stylus of claim 1 further comprising a metallic object which is made substantially of Mg, Cs, Rb, Na, Ba, Sr, Ca, Zn, Cd, Al, Cu, Fe or C.

13. The electronic stylus for the capacitive sensing touch screen of claim 9 wherein the light source has a wavelength between approximately 200 and 700 nm.

14. The electronic stylus for the capacitive sensing touch screen of claim 9 further comprising: a reflective surface substantially surrounding an interior cylindrical wall of the generally hollow cone-shaped attachment wherein the reflective surface focuses the light beam generated by the illuminating device toward the metallic object.

15. The electronic stylus of claim 9 wherein the metallic object is grounded.

16. The electronic stylus of claim 15 wherein the metallic object is grounded through the skin of a user.

17. The electronic stylus of claim 16 wherein the material on the outer surface of the stylus is made of a metallic object.

18. The electronic stylus of claim 15 wherein the ground is a virtual ground.

19. The electronic stylus of claim 9 wherein the metallic object is conductive and has a non-abrasive coating.

20. The electronic stylus of claim 9 where the object registers a touch via an ion cloud, a plasma or via a non-uniform electric field.

21. The electric stylus of claim 1 further comprising a tip wherein the tip is made from a material and shape which is designed to allow electrons and ions to flow to desired area, and back into inside the stylus, or make electrical contact to de-ionize.

22. The electronic stylus of claim 1 further comprising a stylus tip which may be removable allowing the emission of UV light.

23. The electronic stylus of claim 1 further comprising a stylus tip which is designed to enable data transfer.

* * * * *